(12) United States Patent
Tilak

(10) Patent No.: US 10,932,333 B2
(45) Date of Patent: Feb. 23, 2021

(54) ALLOY MELTING AND HOLDING FURNACE

(71) Applicant: Almex USA, Inc., Buena Park, CA (US)

(72) Inventor: Ravindra V. Tilak, Orange, CA (US)

(73) Assignee: Almex USA, Inc., Buena Park, CA (US)

( * ) Notice: Subject to any disclaimer, the term of this patent is extended or adjusted under 35 U.S.C. 154(b) by 0 days.

(21) Appl. No.: 15/943,023

(22) Filed: Apr. 2, 2018

(65) Prior Publication Data
US 2018/0227989 A1  Aug. 9, 2018

Related U.S. Application Data

(63) Continuation of application No. 14/546,681, filed on Nov. 18, 2014, now Pat. No. 9,936,541.
(Continued)

(51) Int. Cl.
*F27D 7/06* (2006.01)
*H05B 6/42* (2006.01)
(Continued)

(52) U.S. Cl.
CPC .............. *H05B 6/42* (2013.01); *C22B 9/003* (2013.01); *C22C 21/00* (2013.01); *C22C 21/06* (2013.01);
(Continued)

(58) Field of Classification Search
CPC .................................. H05B 6/42; C22B 9/003
See application file for complete search history.

(56) References Cited

U.S. PATENT DOCUMENTS 2,286,481 A    7/1940  Fisher
2,863,558 A   12/1958  Brondyke et al.
(Continued)

FOREIGN PATENT DOCUMENTS

CA    1309870    11/1992
CN    1059484     3/1992
(Continued)

OTHER PUBLICATIONS

An office action for the related patent application, patent application No. 2014-7035380.
(Continued)

*Primary Examiner* — Scott R Kastler
(74) *Attorney, Agent, or Firm* — Leech Tishman Fuscaldo & Lampl; William Thomas Babbitt, Esq.

(57) ABSTRACT

An induction furnace comprising a upper furnace vessel; an induction coil positioned below the upper furnace vessel; and a melt-containing vessel positioned inside the induction coil and communicably connected to the upper furnace vessel, wherein the positioning of the melt-containing vessel inside the induction coil defines a gap between an outside surface of the melt-containing vessel and an inside surface of the induction coil. A system for direct-chill casting comprising at least one an induction furnace; at least one in-line filter operable to remove impurities in molten metal; at least one gas source coupled to a feed port associated with the gas; and at least one device for solidifying metal by casting. A method of cooling an induction furnace comprising introducing a gas into a gap between an induction coil and a melt-containing vessel positioned inside the induction coil; and circulating the gas through the gap.

20 Claims, 2 Drawing Sheets

Related U.S. Application Data

(60) Provisional application No. 61/908,065, filed on Nov. 23, 2013.

(51) Int. Cl.

| | | |
|---|---|---|
| *H05B 6/26* | (2006.01) | |
| *H05B 6/28* | (2006.01) | |
| *H05B 6/36* | (2006.01) | |
| *C22B 9/00* | (2006.01) | |
| *C22C 21/16* | (2006.01) | |
| *C22C 21/06* | (2006.01) | |
| *C22C 21/00* | (2006.01) | |
| *F27B 14/06* | (2006.01) | |
| *F27B 14/20* | (2006.01) | |
| *B22D 11/00* | (2006.01) | |
| *B22D 11/10* | (2006.01) | |
| *B22D 11/14* | (2006.01) | |
| *B22D 25/06* | (2006.01) | |
| *B22D 11/04* | (2006.01) | |
| *B22D 11/119* | (2006.01) | |

(52) U.S. Cl.
CPC .............. *C22C 21/16* (2013.01); *F27B 14/06* (2013.01); *F27B 14/061* (2013.01); *F27B 14/20* (2013.01); *F27D 7/06* (2013.01); *H05B 6/26* (2013.01); *H05B 6/28* (2013.01); *H05B 6/367* (2013.01); *B22D 11/003* (2013.01); *B22D 11/0403* (2013.01); *B22D 11/10* (2013.01); *B22D 11/119* (2013.01); *B22D 11/14* (2013.01); *B22D 25/06* (2013.01); *Y02P 10/25* (2015.11)

(56) References Cited

U.S. PATENT DOCUMENTS

| | | |
|---|---|---|
| 3,006,473 A | 10/1961 | Gamber |
| 3,235,089 A | 2/1966 | Burroughs |
| 3,281,238 A | 10/1966 | Bachowski et al. |
| 3,320,348 A | 5/1967 | Seulen et al. |
| 3,335,212 A | 8/1967 | Seulen et al. |
| 3,451,465 A | 6/1969 | Moritz et al. |
| 3,524,548 A | 8/1970 | McDonald et al. |
| 3,800,856 A | 4/1974 | Mizikar et al. |
| 3,834,445 A | 9/1974 | Raschke |
| 3,895,937 A | 7/1975 | Gjosteen et al. |
| 3,947,363 A | 3/1976 | Pryor et al. |
| 4,113,241 A | 9/1978 | Dore |
| 4,188,884 A | 2/1980 | White et al. |
| 4,214,624 A | 7/1980 | Foye et al. |
| 4,221,589 A | 9/1980 | Verstraelen |
| 4,237,961 A | 12/1980 | Zinniger |
| 4,248,630 A | 2/1981 | Balmuth |
| 4,355,679 A | 10/1982 | Wilkins |
| 4,395,333 A | 7/1983 | Groteke |
| 4,427,185 A | 1/1984 | Meyer |
| 4,444,377 A | 4/1984 | Groteke et al. |
| 4,501,317 A | 2/1985 | Sokolowski |
| 4,524,819 A | 6/1985 | Yoshimura |
| 4,527,609 A | 7/1985 | Nugent |
| 4,528,099 A | 7/1985 | Rieger et al. |
| 4,553,604 A | 11/1985 | Yaji et al. |
| 4,556,535 A | 12/1985 | Bowman et al. |
| 4,567,936 A | 2/1986 | Binczewski |
| 4,581,295 A | 4/1986 | DeLiso et al. |
| 4,582,118 A | 4/1986 | Jacoby et al. |
| 4,593,745 A | 6/1986 | Yu et al. |
| 4,597,432 A | 7/1986 | Collins et al. |
| 4,598,763 A | 7/1986 | Wagstaff et al. |
| 4,607,679 A | 8/1986 | Tsai et al. |
| 4,610,295 A | 9/1986 | Jacoby et al. |
| 4,628,985 A | 12/1986 | Jacoby et al. |
| 4,640,497 A | 2/1987 | Heamon |
| 4,651,804 A | 3/1987 | Grimes et al. |
| 4,709,740 A | 12/1987 | Jacoby et al. |
| 4,709,747 A | 12/1987 | Yu et al. |
| 4,724,887 A | 2/1988 | Jacoby et al. |
| 4,761,266 A | 8/1988 | Bruski |
| 4,769,158 A | 9/1988 | Eckert |
| 4,770,697 A | 9/1988 | Zurecki |
| 4,773,470 A | 9/1988 | Libby et al. |
| 4,781,239 A | 11/1988 | Cans et al. |
| 4,809,866 A | 3/1989 | Greene et al. |
| 4,858,674 A | 8/1989 | Enright |
| 4,930,566 A | 6/1990 | Yanagimoto et al. |
| 4,947,925 A | 8/1990 | Wagstaff et al. |
| 4,964,993 A | 10/1990 | Stankiewicz |
| 4,986,337 A | 1/1991 | Soulier |
| 4,987,950 A | 1/1991 | Yu |
| 5,028,570 A | 7/1991 | Winkelbauer et al. |
| 5,032,171 A | 7/1991 | Robare et al. |
| 5,052,469 A | 10/1991 | Yanagimoto et al. |
| 5,091,149 A | 2/1992 | Shin et al. |
| 5,148,853 A | 9/1992 | Yu et al. |
| 5,167,918 A | 12/1992 | Shin et al. |
| 5,176,197 A | 1/1993 | Hamaguchi et al. |
| 5,185,297 A | 2/1993 | Park et al. |
| 5,212,343 A | 5/1993 | Brupbacher et al. |
| 5,320,803 A | 6/1994 | Webster |
| 5,369,063 A | 11/1994 | Gee |
| 5,404,813 A | 4/1995 | Wong |
| 5,415,220 A | 5/1995 | Edwards |
| 5,427,602 A | 6/1995 | DeYoung et al. |
| 5,441,919 A | 8/1995 | Park et al. |
| 5,548,520 A | 8/1996 | Nakamura et al. |
| 5,845,481 A | 12/1998 | Briesch et al. |
| 5,846,481 A | 12/1998 | Tilak |
| 5,873,405 A | 2/1999 | Carrier et al. |
| 6,069,910 A | 5/2000 | Eckert |
| 6,148,018 A | 11/2000 | Garcia et al. |
| 6,279,645 B1 | 8/2001 | McGlade et al. |
| 6,393,044 B1 | 5/2002 | Fishman et al. |
| 6,398,844 B1 | 6/2002 | Hobbs et al. |
| 6,446,704 B1 | 9/2002 | Collins |
| 6,491,087 B1 | 12/2002 | Tilak |
| 6,551,424 B1 | 4/2003 | Haszler et al. |
| 6,675,870 B2 | 1/2004 | Tilak |
| 6,808,009 B2 | 10/2004 | Anderson |
| 6,837,300 B2 | 1/2005 | Cooper et al. |
| 7,000,676 B2 | 2/2006 | Chu et al. |
| 7,204,295 B2 | 4/2007 | Schneider et al. |
| 7,296,613 B2 | 11/2007 | Anderson et al. |
| 7,550,028 B2 | 6/2009 | Riquet et al. |
| 8,056,611 B2 | 11/2011 | Gildemeister et al. |
| 8,196,641 B2 | 6/2012 | Jacques et al. |
| 8,365,808 B1 | 2/2013 | Tilak et al. |
| 8,479,802 B1 | 7/2013 | Tilak et al. |
| 9,616,493 B2 | 4/2017 | Tilak et al. |
| 9,936,541 B2 * | 4/2018 | Tilak .................... F27B 14/061 |
| 2001/0002200 A1 * | 5/2001 | Stanley .................... H05B 6/24 373/153 |
| 2005/0111518 A1 | 5/2005 | Roach et al. |
| 2007/0074846 A1 | 4/2007 | Sommerhofer et al. |
| 2009/0269239 A1 | 10/2009 | Nagakura et al. |
| 2011/0049197 A1 | 3/2011 | Withey et al. |
| 2011/0176576 A1 | 7/2011 | Naitoh et al. |
| 2011/0209843 A2 | 9/2011 | Bes et al. |
| 2011/0247456 A1 | 10/2011 | Rundquist et al. |
| 2012/0148593 A1 | 6/2012 | Elson et al. |
| 2012/0237395 A1 | 9/2012 | Jarry |
| 2012/0300806 A1 | 11/2012 | Prabhu et al. |
| 2013/0247618 A1 * | 9/2013 | Yoshihara ............... F27B 14/10 65/90 |
| 2015/0139852 A1 | 5/2015 | Tilak et al. |
| 2015/0147227 A1 | 5/2015 | Tilak |

(56) References Cited

U.S. PATENT DOCUMENTS

| | | |
|---|---|---|
| 2016/0242239 A1 | 8/2016 | Prabhu et al. |
| 2017/0209919 A1 | 7/2017 | Tilak et al. |

FOREIGN PATENT DOCUMENTS

| | | |
|---|---|---|
| CN | 1064034 | 9/1992 |
| CN | 1164450 A | 11/1997 |
| CN | 1324773 A | 12/2001 |
| CN | 1530623 A | 9/2004 |
| CN | 1611311 | 5/2005 |
| CN | 1925938 | 3/2007 |
| CN | 101428334 | 5/2009 |
| CN | 101648265 | 2/2010 |
| CN | 101712071 | 5/2010 |
| CN | 101967588 | 2/2011 |
| CN | 101984109 | 3/2011 |
| CN | 201892583 | 7/2011 |
| CN | 102165278 A | 8/2011 |
| CN | 102699302 | 10/2012 |
| CN | 103173856 A | 6/2013 |
| CN | 104470655 | 3/2017 |
| CN | 105008064 | 6/2017 |
| DE | 3534300 A1 | 4/1987 |
| DE | 4328045 | 2/1995 |
| DE | 4328045 A1 | 2/1995 |
| DE | 4435764 A1 | 4/1996 |
| EP | 0090583 | 10/1983 |
| EP | 0109170 | 5/1984 |
| EP | 0142341 | 5/1985 |
| EP | 0150922 | 8/1985 |
| EP | 0183563 | 6/1986 |
| EP | 0229211 | 7/1987 |
| EP | 0229218 | 7/1987 |
| EP | 0281238 | 9/1988 |
| EP | 0295008 | 12/1988 |
| EP | 0364097 | 4/1990 |
| EP | 0402692 | 12/1990 |
| EP | 0497254 | 8/1992 |
| EP | 0726114 | 8/1996 |
| EP | 0801516 A1 | 10/1997 |
| EP | 1045216 | 10/2000 |
| EP | 1045216 A2 | 10/2000 |
| EP | 1160208 A2 | 5/2001 |
| EP | 2664397 | 3/2016 |
| GB | 2281312 A | 2/1995 |
| GB | 2281312 | 3/1995 |
| JP | S60127059 | 7/1985 |
| JP | 60180656 | 11/1985 |
| JP | 62176642 | 8/1987 |
| JP | S62176642 | 8/1987 |
| JP | S63118027 | 5/1988 |
| JP | H01233051 | 9/1989 |
| JP | 4313455 | 11/1992 |
| JP | H04325457 A | 11/1992 |
| JP | H0557400 | 3/1993 |
| JP | 8268745 | 10/1996 |
| JP | H09-303971 A | 11/1997 |
| JP | 2002089542 | 3/2002 |
| JP | 2003-501612 A | 1/2003 |
| JP | 2004-239596 A | 8/2004 |
| JP | 2006-513966 A | 4/2006 |
| JP | 2006297100 | 11/2006 |
| JP | 2009150248 | 7/2009 |
| JP | 2011220598 A | 11/2011 |
| KR | 1996-0000355 A | 1/1996 |
| KR | 10-1999-0067299 | 8/1999 |
| KR | 2004-0019961 A | 3/2004 |
| KR | 20080044368 A | 5/2008 |
| KR | 2010-0099248 | 9/2010 |
| KR | 20110138488 A | 12/2011 |
| RU | 2048568 | 11/1995 |
| RU | 2222756 C1 | 1/2004 |
| RU | 2261933 | 10/2005 |
| RU | 2377096 | 12/2009 |
| RU | 2381865 | 2/2010 |
| WO | WO-8702069 | 4/1987 |
| WO | WO-2010094852 | 8/2010 |
| WO | WO-2013173649 | 11/2013 |
| WO | WO-2014121297 | 8/2014 |

OTHER PUBLICATIONS

Almex U.S.A., Inc., Office Action issued by the Russian Federation Patent Office, dated Aug. 28, 2018.

Almex U.S.A., Inc., Third Office Action, Chinese Patent Appl. No. 201480071386.3, dated Feb. 28, 2020.

Almex U.S.A., Inc., First Office Action and Search Report, Chinese Patent Appl. No. 201480071386.3, dated Dec. 12, 2018.

Almex U.S.A., Inc., Second Office Action, Chinese Patent Appl. No. 201480071386.3, dated Sep. 16, 2019.

Almex U.S.A., Inc., Rejection Decision, Chinese Patent Appl. No. 201480071386.3, dated Jul. 3, 2020.

Almex U.S.A. Inc., Written Opinion, Int'l Search Authority, European Patent Office Appl. No. 14815508.8, dated Mar. 15, 2019.

Almex U.S.A., Inc., Office Action issued by the Russian Federation Patent Office, dated Jul. 11, 2019.

Almex U.S.A., Inc., Office Action issued by the Russian Federation Patent Office, dated Jan. 22, 2019.

Almex USA, Inc., European Patent Office, Application No. 14815508.8-1108, Communication pursuant to article 94(3) EPC, related application, dated Sep. 9, 2020.

Almex USA, Inc., Korean office action for Application No. 2015-7032869, related patent application, dated Aug. 27, 2020.

Almex USA, Inc. "European extended search report", EP Application No. 14198973.1, dated May 7, 2015.

Almex USA, Inc., "European extended search report", EP Appln. No. 13150674.3, dated Nov. 18, 2013.

Almex USA, Inc., "European Search Report", EP Application No. 16182786.0, dated Dec. 15, 2016.

Almex USA, Inc., "Final office action", JP Application No. 2015-512865, dated Jul. 26, 2017.

Almex USA, Inc., "First Office Action", CN Application No. 201480007290.0, dated Aug. 1, 2016.

Almex USA, Inc., "International preliminary report on patentability", PCT/US2014/014735, dated Jul. 10, 2015.

Almex USA, Inc., "International Preliminary Report on Patentability", PCT/US2014/014737, dated Jul. 10, 2015.

Almex USA, Inc., "International Preliminary Report on Patentability", PCT/US2013/041457, dated Nov. 27, 2014.

Almex USA, Inc., "International preliminary report on patentability", PCT/US2013/041459, dated Nov. 27, 2014.

Almex USA, Inc., "International Preliminary Report on Patentability", PCT/US2013/041464, dated Nov. 27, 2014.

Almex USA, Inc., "International preliminary report on patentability", PCT Application No. PCT/US2013/041457, dated Nov. 27, 2014, 7 pages.

Almex USA, Inc., "International Search Report and Written Opinion", PCT Application No. PCT/US2013/041464, dated Nov. 27, 2013.

Almex USA, Inc., "International Search Report and Written Opinion", PCT Application No. PCT/US2013/041459, dated Dec. 2, 2013.

Almex USA, Inc., "International Search Report and Written Opinion", PCT Application No. PCT/US2014/014737, dated Jun. 17, 2014.

Almex USA, Inc., "International Search Report and Written Opinion", PCT/US2014/014735, dated Jun. 17, 2014.

Almex USA, Inc., "Invitation to pay additional fees", PCT/US2014/066755, dated Feb. 26, 2015.

Almex USA, Inc., "Non final office action", U.S. Appl. No. 14/401,458, dated May 10, 2017.

Almex USA, Inc., "Non final office action", U.S. Appl. No. 14/401,107, dated Jun. 12, 2017.

Almex USA, Inc., "Non final office action", U.S. Appl. No. 14/546,681, dated Jun. 23, 2017.

Almex USA, Inc., "Non final office action", U.S. Appl. No. 13/474,616, dated Nov. 6, 2012.

Almex USA, Inc., "Notice of Allowance", U.S. Appl. No. 14/401,813, dated Jun. 9, 2017.

(56) References Cited

OTHER PUBLICATIONS

Almex USA, Inc., "Office Action", JP Application No. 2015-512865, dated Feb. 20, 2017.
Almex USA, Inc., "Office Action", JP Application No. 2015-512862, dated Feb. 28, 2017.
Almex USA, Inc., "Office Action", RU Application No. 2014150995, dated May 18, 2017.
Almex USA, Inc., "Office Action", RU Application No. 2014150998, dated May 19, 2017.
Almex USA, Inc., "Office action with search report", CN Application No. 201480001852.0, dated Sep. 1, 2016.
Almex USA, Inc., "Second Office Action", CN Application No. 201480001852.0, dated May 15, 2017.
Almex USA, Inc., "Third Office Action", CN Application No. 201380037685.0, dated Feb. 16, 2017.
Almex USA, Inc., "Written Opinion", PCT/US2014/014735, dated Feb. 20, 2015.
Almex USA, Inc., "Written Opinion", PCT/US2014/014737, dated Feb. 20, 2015.
Anonymous, "Concise description of relevance", U.S. Appl. No. 14/546,681, Feb. 17, 2016.
Anonymous, "Explanation of Relevance", PCT/US2014/066755, Feb. 10, 2016.
Anonymous, "PCT third party observation", PCT/US2014/066755, Feb. 10, 2016.
Anonymous, "Third party submission", U.S. Appl. No. 14/546,681, Feb. 17, 2016.
Gorss, J. B. et al., "Design and operation experience with a coreless inductor furnace for melting alumimium", 12th ABB Conference on Induction Furnaces, Dortmund, Germany, Apr. 17-18, 1991, pp. 301-313.
Heine, H. G. et al., "Coreless Induction Melting of Aluminum", Light Metal Age, Feb. 1991, pp. 18-23.
Nair, C. G. et al., "Technology for Aluminium-Lithium Alloy Production—Ingot Casting Route", Science and Technology of Aluminium-Lithium Alloys, Bangalore, India, Mar. 4-5, 1989, Abstract.
Ohara, K. et al., "Hot-tearing of Al—Li alloys in DC casting", 4th International Conference on Aluminum Alloys: Their Physical and Mechanical Properties, vol. II, Sep. 11-16, 1994, Abstract.
Page, F. M. et al., "The Safety of Molten Aluminium-Lithium Alloys in the Presence of Coolants", Journal de Physique 48, Supplement No. 9, Sep. 1987, C3-63-C3-73.
Proquest, "Semi-Continuous Casting Plant Produces Aluminium-Lithium Alloys", Met. Ind. News 3, Sep. 1986, Abstract.

* cited by examiner

ALLOY MELTING AND HOLDING FURNACE

CROSS-REFERENCE TO RELATED APPLICATIONS

The application is a continuation of U.S. patent application Ser. No. 14/546,681, filed Nov. 18, 2014, which issued as U.S. Pat. No. 9,936,541 on Apr. 3, 2018, which claims the benefit of the earlier filing date of co pending U.S. Provisional Patent Application No. 61/908,065, filed Nov. 23, 2013, now expired, both of which are incorporated herein by reference.

FIELD

Induction melting and holding furnaces, and more particularly to such devices useful in the processing of alloys such as aluminum lithium ("Al—Li") alloys.

BACKGROUND

Al—Li alloys and certain other highly alloyed aluminum alloys have traditionally been melted using induction melt-furnace technology, generally coreless or channel induction types. Due to the chemical activity of lithium in aluminum, standard furnaces, the designs-of-combustion gas fired furnaces, are not used. To melt the Al—Li alloys, indirect inductively generated heat is applied using an induction furnace's electromagnetic field, where the metal in the furnace couples with the magnetic field to generate heat. Coreless induction furnaces typically have a continuous coil, usually copper, surrounding the circumference of the body of the furnace. A channel induction furnace has the induction coil mounted externally to the main body of the furnace, and uses a pass-through method to transfer molten metal through a heating zone. Channel induction furnaces are generally larger than coreless induction furnaces, and were developed because the coreless induction furnaces have a practical size limitation. For both above types of induction furnaces, the heat energy developed via the magnetic field as well as from the molten metal itself requires the induction coils to be liquid cooled using water or glycol or mixtures thereof. Water is generally used as the coolant but this creates a safety issue if a furnace lining failure occurs. The molten metal could penetrate the furnace lining and reach the cooling coil, and if the molten metal penetrates the cooling coil itself, an aluminum explosion could result from aluminum to water contact. A number of publications, including the Guidelines for Handling Molten Aluminum published by The Aluminum Association (USA), discuss explosions and the requirement to keep molten aluminum away from water. When melting and processing Al—Li alloys, the potential for catastrophic explosions with water are greater than for conventional (non-lithium containing) aluminum alloys. For this reason, several furnace manufacturers offer furnace cooling systems that use coolant other than water for coil cooling, particularly halogenated glycols.

Typical aluminum alloys use standard industrial refractories as working lining for the induction furnace. These include mullite, alumina and silica-based materials installed as cast-in-place linings, refractory brick and mortar linings, and precast made-to-fit crucibles. These materials are inserted into the furnace body, along with other intermediate materials to separate the molten aluminum from contacting the furnace induction coils. The lining material exposed to the molten metal is considered an expendable, and is periodically replaced as needed. The backup materials (which do not normally come in direct contact with molten aluminum alloy) have generally longer life than those that come in direct contact, and the backup materials are generally not routinely replaced during a working lining replacement.

Al—Li alloys require special working lining refractories due to the chemical activity of lithium in aluminum. Magnesium oxide (MgO) and alumina ($Al_2O_3$) based refractories are typically used for coreless induction furnaces, while silicon carbide (SiC) based refractories are used in the non-magnetic region away from inductor. For small, laboratory sized induction furnaces, SiC crucibles are used. The primary drawback with MgO is its relatively low heat fatigue resistance. This necessitates that the furnace be maintained hot and not drained on regular basis. This also poses a problem during alloy change as the furnace generally cannot be cooled without cracking the refractory after it has been used for melting metal. As a rule of thumb, if the MgO furnace lining is allowed to cool below 1000° F. it will crack and become unusable. Because Aluminum melts at 1260° F. and is alloyed at 1400° F., the lining has to be permanently kept at 1400° F. Thus, extraneous means are necessary to maintain heat in the furnace at all times, even when not in use, as well as between furnace operating cycles.

Furnaces incorporating technologies other than induction have been employed for melting Al—Li alloys, including resistance heated vacuum furnaces. Aluminum-lithium alloying processes have also used techniques of post-furnace-in-line alloying of the lithium such that the lithium does not contact or contaminate traditional furnace refractories; see U.S. Pat. No. 4,248,630. Refractory products containing free silica and/or phosphates are especially bad when used in conjunction with Al—Li melts, as the lithium preferentially attacks these materials, which leads to almost immediate destruction of the ceramic.

U.S. Pat. No. 5,028,570 ("the '570 patent") teaches that aluminum-lithium alloys that are used in aerospace applications typically contain about 2-3 percent lithium, which significantly increases the strength of aluminum and decreases the weight of the alloy relative to pure aluminum. Only two refractories have been found that can provide a reasonable containment of these alloys. These are oxide-bonded magnesia and silicon-nitride bonded silicon carbide. The '570 patent describes silicon nitride bonded MgO, which is more corrosion resistant to molten Al—Li. Additionally dry vibratory mixes consisting of silicon carbide and alumina (manufactured and marketed by Allied Mineral Corporation, Columbus, Ohio and Saint Gobain Corp of America, Amherst, Mass.) are also employed in conventional coreless induction furnaces used for melting aluminum lithium alloys. Pre-cast and fired crucibles made out of tabular alumina (containing 96 percent of high purity tabular alumina, approximately 2 percent silica and 2 percent titanium oxide) are also in use as main lining material of a melt-containing vessel in aluminum lithium applications. However, all of the above mentioned refractories react with aluminum lithium alloys and produce alloys that tend to and develop spalling coupled with a network of hairline cracks. The problem arises when during charging or skimming or furnace wall cleaning—the refractory undergoes further mechanical abuse. The mechanical abuse enhances the hairline cracks present in the refractory from thermal cycling. This, coupled with chemical reaction between the refractory lining and the lithium containing melt, and further the furnace filled with the low melting eutectics from the melt, gives rise to thicker sections of the entrapped semi-solid, solid, semi-liquid or fully liquid fins of the alloy to form a network within the refractory lining of the vessel wherein such network is slowly progressing to the outer wall of the lining. Because the inductive energy can readily couple with the network of aluminum or aluminum alloy fins of certain thickness (over 1.5 mm) trapped inside the lining, when the furnace is operated at a particular frequency and at required input of electromagnetic power, the network of fins becomes superheated and rapidly advances to the outer boundary of the refractory lining. The resulting failure of the refractory lining becomes a strong limiting factor in the life of the furnace. If the failure of the refractory lining were to present itself only as a pure expense, it would only remain as an addressable cost item. However, the sudden advancement of liquid aluminum lithium alloy towards the induction coil through the damaged refractory lining of the melt-containing vessel presents a catastrophic explosion possibility if it were to reach even one or two turns of the induction coil. Thus, absent a refractory material that is chemically inert to molten aluminum lithium alloys, there remains a distinct need to isolate the induction coil completely from the refractory lining of the melt-containing vessel.

Typical induction furnaces operate at very low electrical frequencies. To obtain stirring of the melt during the melting process, a low frequency is important to obtain a rapid melt rate. However, the rapid melt rate makes the task of keeping the lithium in the melt more difficult unless tightly controlled inert atmosphere is continuously maintained above the melt. U.S. Pat. No. 5,032,171 describes the use of low frequency induction power to stir the melt vigorously such that removal of lithium is promoted. When using a higher frequency induction furnace, less stirring occurs, as movement of the molten metal is an inverse function of operating frequency. Higher frequency results in less stirring, however, higher frequency also results in coupling more of the induction energy closer to the inside wall of the melt-containing vessel, and if the fins are present strong coupling and thereby superheating of the fins results which additionally accelerates the degradation of the refractory. Thus using lower frequency in the power source cannot mitigate the degradation of the refractory lining. Another issue related to using low frequency (to achieve rapid melting) is the resultant forceful stirring that leads to the entrainment of non-metallic particles and undesirable oxides in the melt. Because lower frequencies result in more melt stirring, an operating frequency compromise is often made to suit the operation but only at the expense of doing more damage to the refractory lining and weakening the control over the bath temperature.

For scrap melting, where quality is secondary to productivity, lower frequencies are typically used. When producing high quality melts, higher frequencies are used to reduce undesirable stirring, at the expense of productivity.

Another fundamental factor connected with Al—Li melts is the degree of hydrogen solubility in the molten Al—Li alloy. Because hydrogen is completely soluble in pure molten lithium (which melts at only 400° F.), the molten Al—Li alloy at 1400° F. captures significant amount of hydrogen in the alloyed melt. For example, a furnace melt of typical non lithium containing aerospace aluminum alloy AA 7050 will have hydrogen content in a freshly prepared melt in a reverberatory melting furnace of 0.5 cc/100 gms of molten alloy. As compared to this, the amount of dissolved hydrogen in a freshly prepared melt of 1.2 percent Li alloy melted inside a controlled atmosphere induction furnace is 1.5 cc/100 gms of molten alloy. Hydrogen in the regular aluminum alloys as well as in the aluminum lithium alloys is deleterious because it gives rise to porosity in the cast products. Such porosity in the cast condition of the alloy is difficult to heal during thermo-mechanical processing and affects the strength, ductility, corrosion resistance and fatigue resistance of the finished products made from such castings that carry higher amount of hydrogen. Besides the hydrogen coming in to the molten Al—Li alloy through the addition of lithium, there is another source that contributes to hydrogen pick up in the melt. This source is chemical in nature. Al—Li melts are extremely powerful reducing agents and they strip away bonded hydrogen from components of the refractory used in the melt-containing vessel. The binding agents used in the preparation of the melt vessel refractory typically contain caustic or phosphoric acids or water or organic activators, all of which contain some amount of bonded hydrogen. This hydrogen can be stripped away by Al and Li atoms and is readily absorbed by the melt with simultaneous formation of AL-Li oxides, carbides, borides, etc. A representative chemical reaction is $2Al+3H_2O=Al_2O_3+6H$, whereby large quantity of hydrogen is liberated and retained by the melt.

Besides the above two contributors of hydrogen, there is yet another source of hydrogen transport in to the melt. This transport happens through the refractory of the melt-containing vessel of any standard induction-melting furnace. The transport happens readily because a) there is higher partial pressure of hydrogen outside the outer wall of the refractory (which sits within the coil grout) than it is on the inside wall of the vessel refractory lining (which is in contact with the melt), b) hydrogen being the smallest atom, the kinetics and the coefficient of hydrogen transfer are very favorable to maintain a continuous diffusion of hydrogen, driven by the hydrogen partial pressure difference. The coil grout is always in direct contact with the plant atmosphere and depending on the humidity (which is always high in an aluminum cast house since water is used as a heat extraction media), a reasonable amount of moisture (relative humidity 20 percent or higher) and thereby hydrogen is reminiscent on the outside surface of the coil grout. To reduce such hydrogen pick-up in the melt transported through the refractory, the industry has found it necessary to employ another electrical holding furnace to degas the specialty alloy melts including Al—Li melts prior to casting. Such holding furnaces are of three designs, (i) vacuum is either applied on top of the Al—Li bath surface, or (ii) the exterior of melt-containing vessel is maintained in vacuum, or (iii) vacuum is applied at both locations, in the interior as well as the exterior.

DETAILED DESCRIPTION

Figure 1:
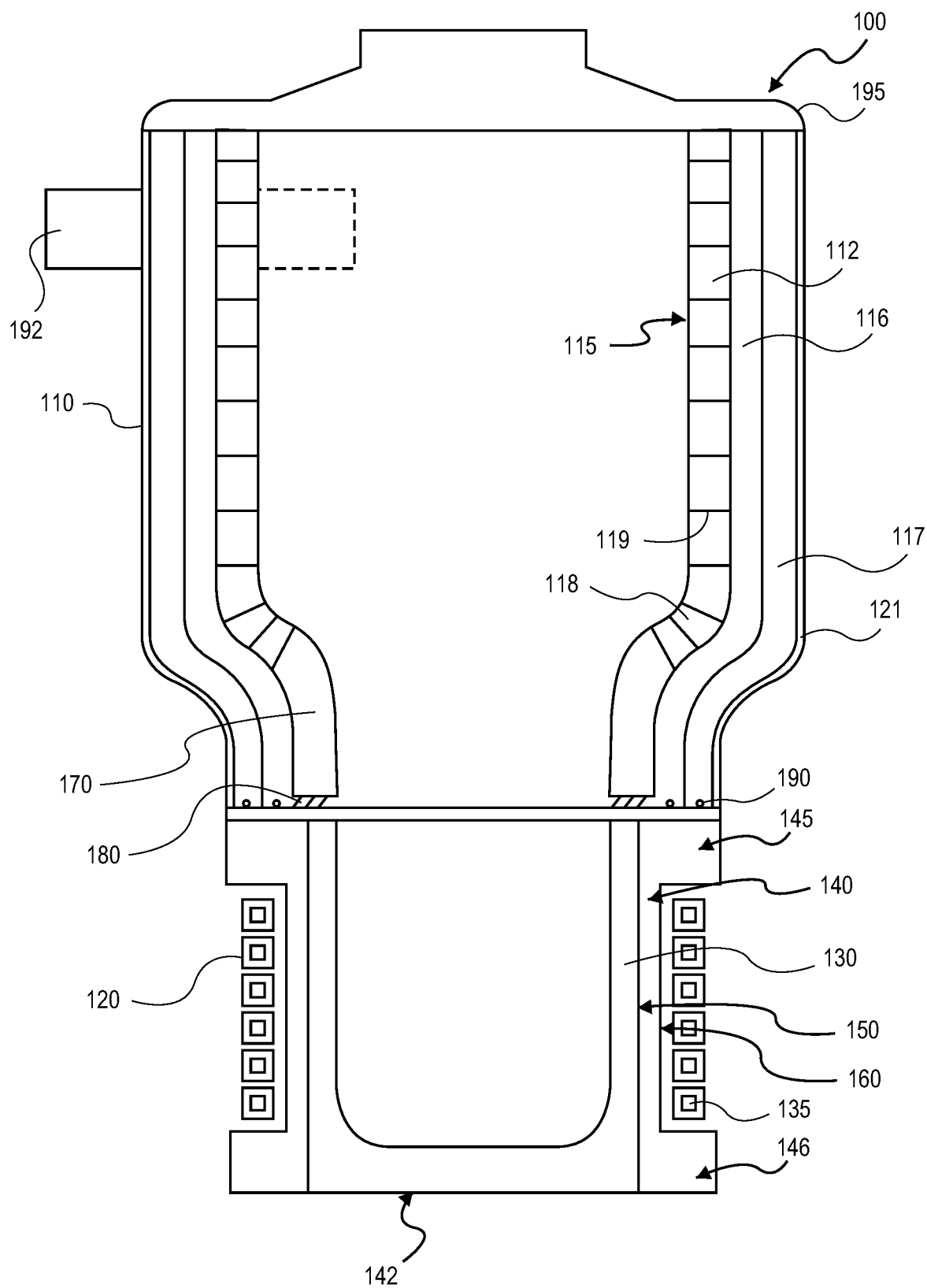
FIG. 1 is a cross-sectional view of an embodiment of an induction furnace.

FIG. 1 shows a cross-sectional side view of an embodiment of an induction furnace. In this embodiment, induction furnace 100 is a two-part furnace with a bottom-located inductor. Induction furnace 100 is capable of operating in a high and/or a low frequency mode ranging from 200 hertz to 80 hertz. Induction furnace 100, in this embodiment, includes upper furnace vessel 110, induction coil 120 positioned below upper furnace vessel 110 (as viewed); and lower melt-containing vessel 130 placed inside induction coil 120 and communicably connected to upper furnace vessel 110. Identification of the inductor furnace as a bottom-located induction type refers to the positioning or placement of only the lower or melt-containing vessel 130 inside induction coil 120 rather than both melt-containing vessel 130 and upper furnace vessel 110.

In one embodiment, melt-containing vessel 130 has a generally cylindrical shape with a representative with interior diameter of 10 inches to 50 inches depending, for example, on a furnace melt rate requirement.

In the embodiment shown in FIG. 1, induction coil 120 is a coiled induction coil defined by a coil or coils having lumen or opening 135 therethrough through which a coolant such as a liquid coolant of water or glycol or a gaseous coolant such as a refrigerant is introduced (e.g., pumped). In another embodiment, induction coil 120 may be a solid core coil or an externally air cooled coil. In one embodiment, induction coil 120 has a generally cylindrical shape with having an interior diameter that accommodates melt-containing vessel 130.

Illustrated in the embodiment of induction furnace 100 is gap 140 between the outside surface 150 of the melt-containing vessel 130 and inside surface 160 of induction coil 120. Gap 140 is operable to allow a gas to be circulated, entering from feed port 145 and exiting from discharge port 146 with feed port 145 and discharge port 146 associated with gap 140, respectively. In one embodiment, gap 140 is at least one-half inch (0.5"), preferably 1.25 inches to 1.5 inches wide. Circulated in one embodiment means gas is introduced at feed port 145 and moves within gap 140 around melt-containing vessel 130 and exits at discharge port 146 to waste. In another embodiment, circulated means gas is introduced at feed port 145 and moves through gap 140 around melt-containing vessel 130, exits at discharge port 146 and is then reintroduced into feed port 145 (via a circulation loop). In either embodiment, it is desired that gas is circulated or moved around a portion, in one embodiment an entire portion, or substantially an entire portion of melt-containing vessel 130. In this manner, the gas is operable to cool an exterior of melt-containing vessel 130. To aid in the circulation of gas around melt-containing vessel 130, baffles may be added that extend, for example, inside surface 160 of induction coil 120 and direct the gas around outer surface 150 of melt-containing vessel 130. The embodiment illustrated in FIG. 1 includes one feed port and one exit port. In another embodiment, there may be more than one feed port and/or discharge port.

In one embodiment, the gas circulated through gap 140 is an inert gas. At least one inert gas selected from the group consisting of argon, helium, neon, krypton, xenon, and radon is circulated through the gap between the induction coil and the melt-containing vessel. The circulating gas has preferably at least 5 percent helium in it to improve the heat transfer capability. In one embodiment, the circulating gas comprises a mixture of about 80 percent argon and about 20 percent helium. In another embodiment, the circulating gas is air. In yet another embodiment, gas is air or nitrogen and an inert gas such as helium. A representative circulation mechanism is run continuously so long as the furnace is at a temperature of 300° F. or over. The circulated gas exiting from discharge port 146 associated with melt-containing vessel 130, in one embodiment, is cooled outside of the furnace and re-circulated back into the gap (i.e., introduced into feed port 145 and gap 140). In one embodiment, a representative flow rate of an inert gas is of the order of 12,000 cubic feet per minute (cfm) and the temperature of the outer surface of the melt-containing vessel is maintained below 150° F. This assures maintaining a freeze plane of the molten alloy well inside the refractory lining of the melt-containing vessel 130. In one embodiment, moisture from the circulated gas may be removed before it is re-circulated with the use of an in-line dehumidifier. For certain aluminum alloys that do not contain reactive elements such as lithium, the gas circulated through gap 140 can be atmospheric air input at ambient temperature and exhausted to the atmosphere. Reactive elements are elements that violently react with water, hydrogen or a component of air (e.g., nitrogen, oxygen) at high temperature. A representative flow rate of such air will be about 12,000 cfm or as appropriate to keep the outside temperature of melt-containing vessel 130 at about 150° F. or lower.

The instantly described furnace vessel and method of circulating gas improve the safety of melting and DC casting of Al—Li alloys by minimizing or eliminating ingredients that must be present for an explosion to occur. It is understood that water (or water vapor or steam) in the presence of the molten Al—Li alloy will produce hydrogen gas. A representative chemical reaction equation is believed to be:

$$2\text{LiAl} + 8\text{H}_2\text{O} \rightarrow 2\text{LiOH} + 2\text{Al(OH)}_3 + 4\text{H}_2(g).$$

By maintaining a freeze plane within a melt-containing vessel 130, and preferably within the vessel wall, well away from an outer portion of the vessel wall, the opportunity for molten Li—Al to escape from the vessel is inhibited. Such escape and contact with induction coil 120 could otherwise be catastrophic.

In one embodiment, melt-containing vessel 130 has an exterior surface that is hoop-wrapped with tightly wound double tweed high temperature fiberglass cloth cemented to an exterior of the containing vessel with a silicon carbide based high temperature refractory adhesives. Melt-containing vessel 130 is provided with a molten aluminum resistant working lining that, in one embodiment, has an electrical resistivity of between about 1,000 and about 10,000 micro ohm centimeters. In another embodiment, the resistivity is over 1,000,000 micro ohm centimeters. In one embodiment, a working lining of melt-containing vessel 130 is a refractory ceramic.

To detect leak or bleed out of molten metal, at least one grid of mica conductor net is placed at or about outside surface 150 of the melt-containing vessel 130, the electrically conducting grid defined by the net connected to a circuit to detect leakage of the melt. Such circuit may be linked to an alarm through, for example, a controller. Representatively, the mica grid is connected to an alarm system and works as leak detection device by completing the electrical circuit between the metal and ground neutral when the leaked metal touches the mica grid. In one embodiment, to assure further safety of operation, multiple grids of mica are placed in at least three locations including (i) the outer cylindrical surface of melt-containing vessel 130, (ii) bottom 142 of the melt-containing vessel 130; and (iii) at inside surface 160 of induction coil 120.

For melt degassing purposes, a vacuum-generating device for degassing of alloy melt in induction furnace 100 can be used. The vacuum-generating device applies vacuum to a top surface of the alloy melt in induction furnace 100. Another method used for furnace degassing is to sparge argon gas using gas diffusor blocks of graphite or silicon carbide.

Upper furnace vessel 110 and melt-containing vessel 130 are communicably connected with interface ring 170 of, for example, silicon carbide and thermal ring-shaped gasket 180. The mating interface may be further sealed with one or more rope gaskets 190 (e.g., titanium rope gaskets).

In the embodiment shown in FIG. 1, induction furnace 100 is of the tilting type, tilting along axis 192.

In one embodiment, clean out port is located at or near the upper end of upper furnace vessel 110 and the steel shell. In one embodiment, it is located opposite to the tilting axis. The shell has a refractory lined interior for the containment of molten aluminum, including cover 195 over the interior to seal the furnace atmosphere. Representatively, the furnace atmosphere is maintained at argon pressure of one inch water column (±0.75 inch water column). Representatively, an oxygen concentration inside the furnace is 0.1 percent volume (from 0.05 to 0.2 percent volume).

Furnace vessel 110, in one embodiment, includes a molten aluminum alloy resistant working lining; an intermediate layer of a high temperature compressible refractory material capable of allowing for expansion and contraction of the working lining; and an outermost layer including about 70 percent alumina, about 10 percent silica, about three percent calcium oxide and a binder material, all mounted inside a steel shell having typically one inch thickness, and wherein the inside diameter of the refractory lining provides for about 80 percent capacity of the total holding capacity of the furnace and the balance about 20 percent capacity is taken up by the inductor and the region joining the inductor and the main vessel of the furnace. This proportion of capacities can also be, respectively, about 90 percent and 10 percent.

In one embodiment, a working lining of furnace vessel 110 includes innermost lining 112 of pure grade silicon carbide (SiC); nitride bonded silicon carbide; yttria-stabilized zirconia with special additives for controlling chemical reactivity, or 85 percent SiC+15 percent alumina or tabular sintered alumina or high purity magnesia bonded with nitride bonded silicon carbide. This working lining is essentially devoid of free silicon, silicon dioxide, carbon fibers, graphite fibers, phosphate bonding gents, calcium aluminate, calcium silicate, cement, lime (calcium carbonate), oncrystalline weak oxides, amorphous weak oxides, or any other refractory, non-refractory, metallic additive or bonding agent that chemically reacts with molten aluminum alloys, and specifically Al—Li alloys containing up to about 5 percent lithium. Innermost lining 112 has an inner surface coated with silicon carbide paint 115 or plasma coated with zirconia, magnesium oxide or niobium metal.

Referring to furnace vessel 110, vessel 110 includes back-up layer 116 on innermost lining 112. In one embodiment, back-up layer 116 is monolithically cast and sintered as a single unit. In another embodiment, back-up layer 116 is rendered of multiple isostatically pressed and sintered building blocks assembled in tongue-and-groove formation such as blocks 118 of innermost lining 112 and held together with silicon carbide based high temperature mortar 119 or manufactured as a hot isostatically pressed full size crucible, followed by high temperature bake out and sintering.

Another back-up layer 117 on back-up layer 116 of furnace vessel 110, in one embodiment, is made of a high temperature compressible refractory material capable of allowing for expansion and contraction of the innermost lining 112 and back-up layer 116. Representative materials for back-up layer 117 include dried zirconia powder, a zirconia and alumina powder mixture, and compressible thermally noon-conducting refractory fibers which are non-wetting to molten aluminum alloys and is typically two inches to four inches in thickness running on the interior of the steel shell adjacent to ceramic paper 121, the ceramic paper being inside the steel shell.

In one embodiment, induction furnace 100 is used to prepare melts of Li—Al alloys which typically contain lithium in the range of 0.1 percent to 6.0 percent, copper in the range of 0.1 percent to 4.5 percent, and magnesium in the range of 0.1 percent to 6 percent with silver, titanium, zirconium as minor additives along with traces of alkali and alkaline earth metals with balance aluminum. Such alloys are very easily oxidizable in liquid state, react violently in liquid stage upon contact with water but have much lower density (by 10 percent) than aluminum alloys and exhibit higher strength and stiffness. In another embodiment, induction furnace may be used to prepare melts of other alloys, including but not limited to, other aluminum alloys. In one embodiment, a Li—Al alloy prepared using induction furnace 100 has properties that meet the requirements of 100,000 pounds per square inch (psi) tensile strength and 80,000 psi yield strength.

Figure 2:
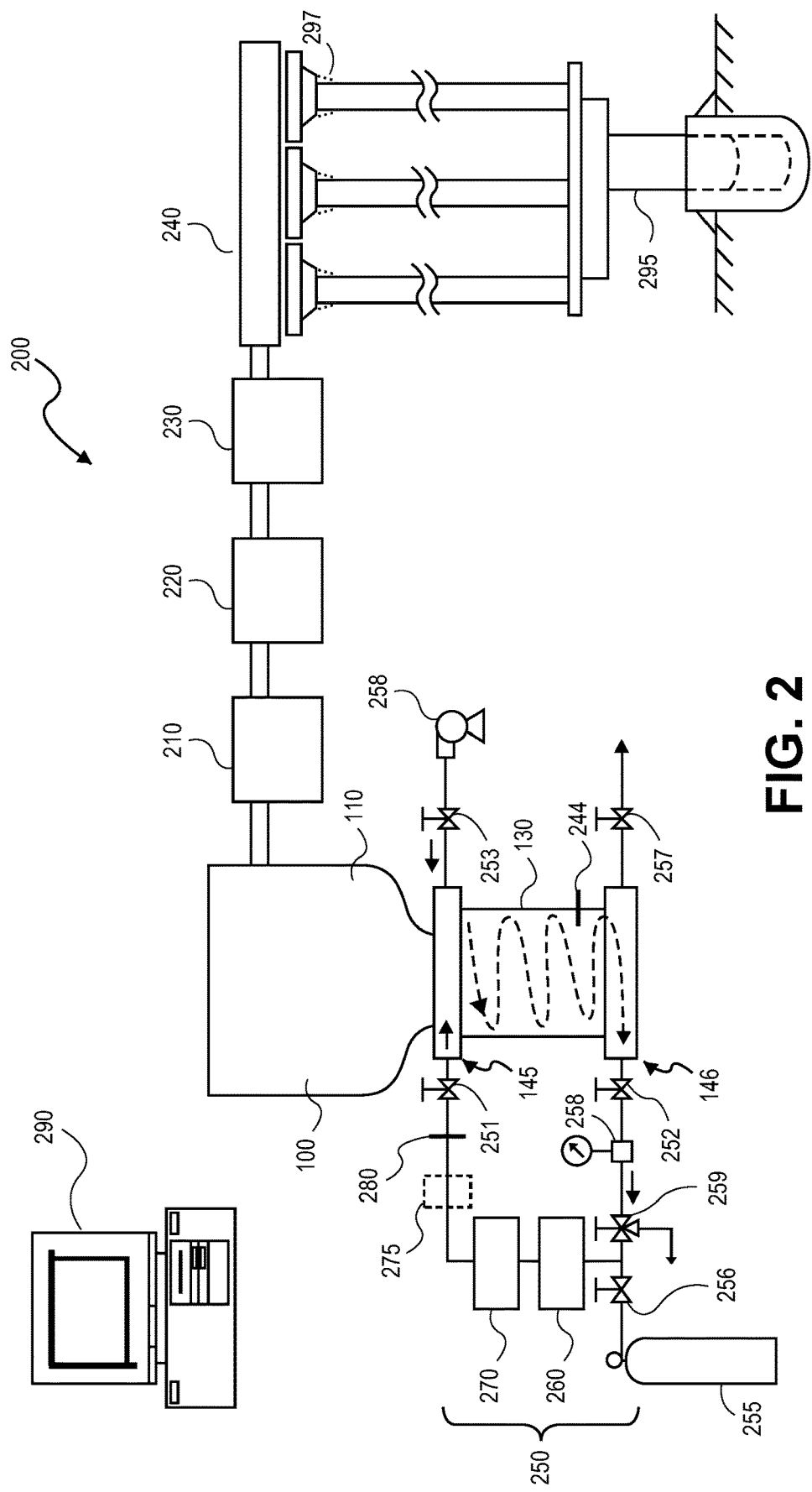
FIG. 2 is a schematic side view of a system operable to form one or more billets or slabs or ingots from an alloy melt.

FIG. 2 presents a side view of a schematic of a system for forming one or more billets or slabs or other forms in a direct chill casting process. According to FIG. 2, system 200 includes induction furnace 100 as described in detail with reference to FIG. 1. Induction furnace 100 includes furnace vessel 110 and melt-containing vessel 130 around which an inductor coil is located (inductor coil 120, FIG. 1). In one embodiment of making an Al—Li alloy, a solid charge of aluminum and lithium and any other metals for the desired alloy are introduced into a lower portion of furnace vessel 110 and into melt-containing vessel 130. The metals are melted by induction heating and the melted metals are transferred to first filter 210, through degasser 220, to second filter 230 and to billet forming station 240.

Induction furnace 100 in system 200 includes an induction coil (induction coil 120, FIG. 1) surrounding melt-containing vessel 130. As illustrated in FIG. 1, there is a gap (gap 140, FIG. 1) between an outside surface of melt-containing vessel 130 and an inside surface (inside surface 160, FIG. 1) of the induction coil. In one embodiment, an inert gas is circulated in the gap. The representation of induction furnace 100 in FIG. 2 shows gas circulating around a representatively cylindrical melt-containing vessel (e.g., around the entire outer surface of the vessel). FIG. 2 shows a gas circulation subsystem associated with system 200. In one embodiment, a gas, such as an inert gas, is supplied from gas source 255 through, for example, a stainless steel tube. Various valves control the supply of the gas. When a gas is supplied from gas source 255, valve 256 adjacent gas source 255 is open as is valve 251 to allow gas to be introduce into feed port 145 and valve 252 to allow gas to be discharged from discharge port 146 into the circulation subsystem. The gas is introduced into feed port 145 associated with induction furnace 100. The introduced gas circulates in the gap (gap 140) between melt-containing vessel 130 and the induction coil (induction coil 120, FIG. 1). The circulated gas then exits induction furnace 100 through discharge port 146. From discharge port 146, the gas is passed through in-line hydrogen analyzer 258. Hydrogen analyzer 258 measures an amount (e.g., a concentration) of hydrogen in the gas stream. If the amount exceeds, for example, 0.1 percent by volume, the gas is vented to the atmosphere through vent valve 259. The circulated gas from discharge port 146 is also passed through purifier 260. Purifier 260 is operable or configured to remove hydrogen and/or moisture from the inert gas. An example of a purifier to remove moisture is a dehumidifier. From purifier 260, the gas is exposed to heat exchanger 270. Heat exchanger 270 is configured to remove heat from the gas to regulate a gas temperature to, for example, below 120° F. Representatively, in circulating through the gap between the induction coil and the melt-containing vessel, a gas may pick up/retain heat and a temperature of the gas will rise. Heat exchanger 270 is configured to reduce the temperature of the gas and, in one embodiment, to return such temperature to a target temperature which is below 120° F. and, in one embodiment, is around room temperature. In one embodiment, in addition to exposing the gas to heat exchanger 270, the gas may be cooled by exposing the gas to a refrigeration source 275. In this manner, the temperature of the gas may be reduced significantly prior to entering/re-entering induction furnace 100. As shown in FIG. 2, the gas circulation subsystem 250 includes a temperature monitor 280 (e.g., a thermocouple) prior to feed port 145. Temperature monitor 280 is operable to measure a temperature of a gas being fed into feed port 145. The circulation of gas through the described stages of gas circulation subsystem 250 (e.g., hydrogen analyzer 258, purifier 260, heat exchanger 270 and refrigeration source 275) may be through a tube, e.g., a stainless steel tube, to which each described stage is connected. In addition, it is appreciated that the order of the described stages may vary.

In another embodiment, the gas circulated through the gap (gap 140, FIG. 1) between the melt-containing vessel 130 and the induction coil (induction coil 120, FIG. 1) is atmospheric air. Such an embodiment may be used with alloys that do not contain reactive elements as described above. Referring to FIG. 2, where atmospheric air is to be introduced into the gap, gas circulation subsystem 250 may be isolated to avoid contamination. Accordingly, in one embodiment, valves 251, 252 and 256 are closed. To allow the introduction of air into feed port 145, air feed valve 253 is opened. To allow discharge from discharge port 146, air discharge valve 257 is opened. Air feed valve 253 and air discharge valve 257 are closed when gas circulation subsystem 250 is used and a gas is supplied from gas source 255. With air feed valve 253 and air discharge valve 257 open, atmosphere air is supplied to the gap (gap 140, FIG. 1) by blower 258 (e.g., a supply fan). Blower 258 creates an air flow that supplies air (e.g., through tubing) to feed valve 145 at a volume representatively on the order of 12,000 cfm. Air circulates through the gap (gap 140), FIG. 1) and is discharged through discharge port 146 to the atmosphere.

As noted above, from induction furnace 100, a melted alloy flows through filter 210 and filter 230. Each filter is designed to filter impurities from the melt. The melt also passes through in-line degasser 220. In one embodiment, degasser 220 is configured to remove undesired gas species (e.g., hydrogen gas) from the melt. Following the filtering and degassing of the melt, the melt may be introduced to billet- or slab-forming system 240 where one or more billets or slabs may be formed in, for example, a direct-chill casting process.

The system described above may be controlled by a controller. In one embodiment controller 290 is configured to control the operation of system 200. Accordingly, various units such as induction furnace 100; first filter 210; degasser 220; second filter 230; and billet forming system 240 are electrically connected to controller 290 either through wires or wirelessly. In one embodiment, controller 290 contains machine-readable program instructions as a form of non-transitory media. In one embodiment, the program instructions perform a method of melting a charge in induction furnace 100 and delivering the melt to billet- or slab-forming system 240. With regard to melting the charge, the program instructions include, for example, instructions for operating the induction coil and circulating gas through the gap between the induction coil and melt-containing vessel 130. With regard to delivering the melt to billet- or slab-forming system 240, such instructions include instructions for establishing a flow of the melt from induction furnace 100 through the fillers and degassers. At billet- or slab-forming system 240, the instructions direct the formation of one or more billets. With regard to forming one or more billets, the program instructions include, for example, instructions to lower the one or more casting cylinders 295 and spraying coolant 297 to solidify the metal alloy cast.

In one embodiment, controller 290 also regulates and monitors the system. Such regulation and monitoring may be accomplished by a number of sensors throughout the system that either send signals to controller 290 or are queried by controller 290. For example, with reference to induction furnace 100, such monitors may include one or more temperature gauges/thermal couples associated with melt-containing vessel 130 and/or upper furnace vessel 110. Other monitors include temperature monitor 280 associated with gas circulation subsystem 250 that provides the temperature of a gas (e.g., inert gas) introduced into the gap (e.g., gap 140, FIG. 1) between melt-containing vessel 130 and inside surface of the induction coil. By monitoring a temperature of the circulation gas, a freeze plane associated with melt-containing vessel 130 may be maintained at a desired position. In one embodiment, a temperature of an exterior surface of melt-containing vessel may also be measured and monitored by controller 290 by placing a thermocouple adjacent to the exterior surface of melt-containing vessel 130 (thermocouple 244). Another monitor associated with gas circulation subsystem 250 is associated with hydrogen analyzer 258. When hydrogen analyzer 258 detects an excess amount of hydrogen in the gas, a signal is sent to or detected by controller 290 and controller 290 opens vent valve 259. In one embodiment, controller 290 also controls the opening and closing of valves 251, 252 and 256 associated with gas circulation subsystem 250 when gas is supplied from gas source 255 (each of the valves are open) with, for example, a flow rate of gas controlled by the extent to which controller 290 opens the valves and, when ambient air is supplied from blower 258, each of the valves are closed and air feed valve 253 and air discharge valve 257 are open. In one embodiment, where air is circulated through the gap (gap 140, FIG. 1), controller may regulate the velocity of blower 258 and/or the amount feed valve 253 is open to regulate a temperature of an exterior surface of melt-containing vessel 130 based, for example, on a temperature measurement from thermocouple 244 adjacent an exterior of melt-containing vessel 130. A further monitor includes, for example, probes associated with a bleed out detection subsystem associated with induction furnace 100 (e.g., see mica probe discussion above). With regard to the overall system 200, additional monitors may be provided to, for example, monitor the system for a molten metal bleed out or run out.

The above-described system may be used to form billets or slabs or other forms that may be used in various industries, including, but not limited to, automotive, sports, aeronautical and aerospace industries. The illustrated system shows a system for forming billets or slabs by a direct-chill casting process. Slabs or other than round or rectangular may alternatively be formed in a similar system. The formed billets may be used, for example, to extrude or forge desired components for aircraft, for automobiles or for any industry utilizing extruded metal parts. Similarly, slabs or other forms of castings may be used to form components such as components for automotive, aeronautical or aerospace industries such as by rolling or forging.

The above-described system illustrates one induction furnace. In another embodiment, a system may include multiple induction furnaces and, representatively, multiple gas circulation subsystems including multiple source gases, multiple fillers and degassers.

In the description above, for the purposes of explanation, numerous specific requirements and several specific details have been set forth in order to provide a thorough understanding of the embodiments. It will be apparent however, to one skilled in the art, that one or more other embodiments may be practiced without some of these specific details. The particular embodiments described are not provided to limit the invention but to illustrate it. The scope of the invention is not to be determined by the specific examples provided above but only by the claims below. In other instances, well-known structures, devices, and operations have been shown in block diagram form or without detail in order to avoid obscuring the understanding of the description. Where considered appropriate, reference numerals or terminal portions of reference numerals have been repeated among the figures to indicate corresponding or analogous elements, which may optionally have similar characteristics.

It should also be appreciated that reference throughout this specification to "one embodiment", "an embodiment", "one or more embodiments", or "different embodiments", for example, means that a particular feature may be included in the practice of the invention. Similarly, it should be appreciated that in the description various features are sometimes grouped together in a single embodiment, figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

What is claimed is:

1. An induction furnace assembly for melting of an alloy, the induction furnace assembly comprising:
    an induction coil;
    a melt-containing vessel positioned inside the induction coil, wherein the positioning of the melt-containing vessel inside the induction coil defines a gap between an outside surface of the melt-containing vessel and an inside surface of the induction coil;
    at least one feed port and at least one discharge port each in fluid connection with the gap;
    at least a temperature sensor to measure a temperature of an exterior surface of the melt-containing vessel;
    a gas source coupled to the at least one feed port, the gas source comprising at least one gas, wherein the at least one gas from the gas source is operable to be transmitted between the feed port and the discharge port at a flow rate to control the temperature of the exterior surface of the melt-containing vessel to maintain a freeze plane of a melt in the melt-containing vessel that is inside a lining of the melt-containing vessel.

2. The induction furnace assembly of claim 1, further comprising an upper furnace vessel communicably coupled to the melt-containing vessel, wherein the induction coil is positioned below the upper furnace vessel.

3. The induction furnace assembly of claim 1, wherein the at least one gas is selected from the group consisting of argon, helium, neon, krypton, xenon, and radon and is circulated through the gap between the induction coil and the melt-containing vessel.

4. The induction furnace assembly of claim 1, wherein the at least one gas comprises a gas mixture containing helium wherein concentration of the helium is at least 8 percent by volume.

5. The induction furnace assembly of claim 1, wherein the at least one gas comprises a mixture of about 80 percent argon and about 20 percent helium.

6. The induction furnace of claim 2, wherein the at least one gas comprises air.

7. The induction furnace assembly of claim 1, wherein the temperature sensor comprises a first temperature sensor, the induction furnace further comprising:
    a second temperature sensor operable to measure a temperature of the at least one gas introduced into the at least one feed port;-and
    a controller operable to monitor the first temperature sensor and the second temperature sensor and control a supply of the least one gas to the least one feed port based on the temperature of the exterior surface of the melt-containing vessel.

8. The induction furnace assembly of claim 1, wherein the gap is at least one-half inch.

9. The induction furnace assembly of claim 1, wherein the induction coil is a cooled induction coil.

10. The induction furnace assembly of claim 1, further comprising at least one conducting grid of mica placed at or about the outside surface of the melt-containing vessel, said grid connected to a circuit to detect leakage of the melt.

11. The induction furnace assembly of claim 1, wherein the melt containing vessel is operable to process a melt comprising aluminum and at least one other element that is a reactive element, wherein the reactive element is an element that reacts with water, hydrogen or a component of air at high temperature.

12. The induction furnace assembly of claim 11, wherein the reactive element is lithium.

13. A method of cooling an induction furnace comprising:
    introducing a gas into a gap between an induction coil and a melt-containing vessel positioned inside the induction coil. wherein prior to introducing the gas into the feed port, a temperature of the gas is reduced; and
    circulating the gas through the gap, thereby maintaining a freeze plane of a melt in the melt-containing vessel that is inside a lining of the melt-containing vessel.

14. The method of claim 13, wherein the gas is operable to cool a surface of the melt-containing vessel when a melt is contained within the melt-containing vessel.

15. The method of claim 13, wherein circulating comprises introducing gas discharged from a discharge port associated with the gap into a feed port associated with the gap.

16. The method of claim 14, wherein the gas is air.

17. The method of claim 13, further comprising containing a melt in the melt-containing vessel, wherein the melt comprises an element that is not a reactive element, wherein the reactive element is an element that reacts with water, hydrogen or a component of air at high temperature.

18. The method of claim 13, further comprising containing a melt in the melt containing vessel, wherein the melt comprises aluminum and at least one other element that is a reactive element, wherein the reactive element is an element that reacts with water, hydrogen or a component of air at high temperature.

19. The method of claim 18, wherein the at least one other element comprises lithium.

20. The method of claim 13, further comprising containing a melt in the melt-containing vessel, wherein the melt comprises an aluminum-lithium alloy comprising properties that meet requirements of 100,000 pounds per square inch (psi) tensile strength and 80,000 psi yield strength.

\* \* \* \* \*